Dec. 2, 1958  M. P. BAKER  2,862,741
OSCILLATORY JOINT
Filed Oct. 16, 1956  2 Sheets-Sheet 1
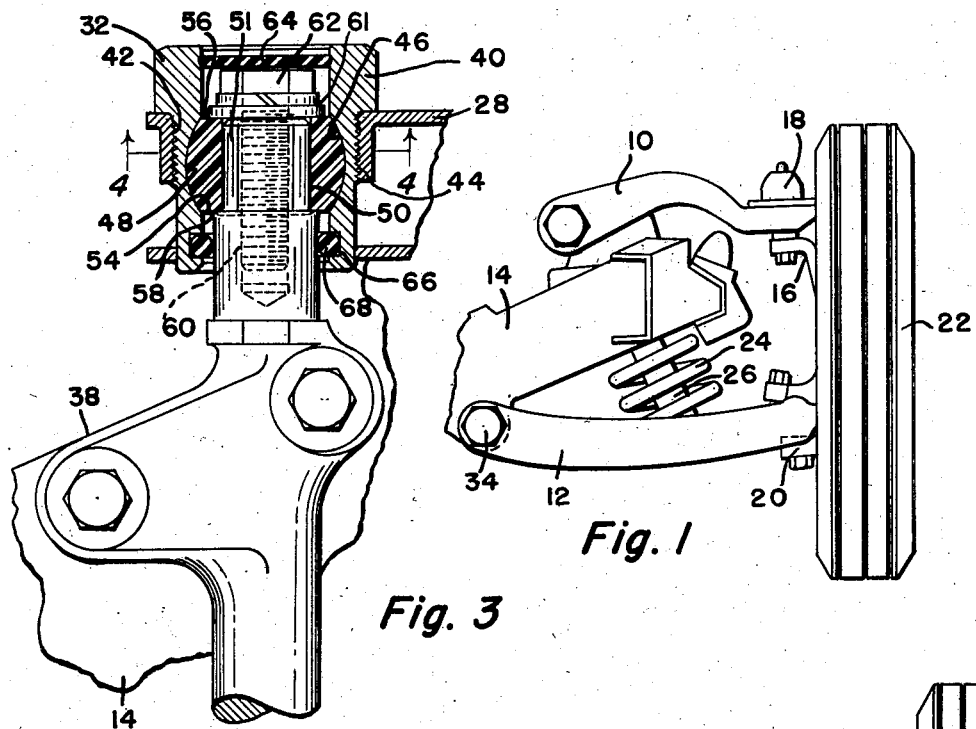
Fig. 1
Fig. 3
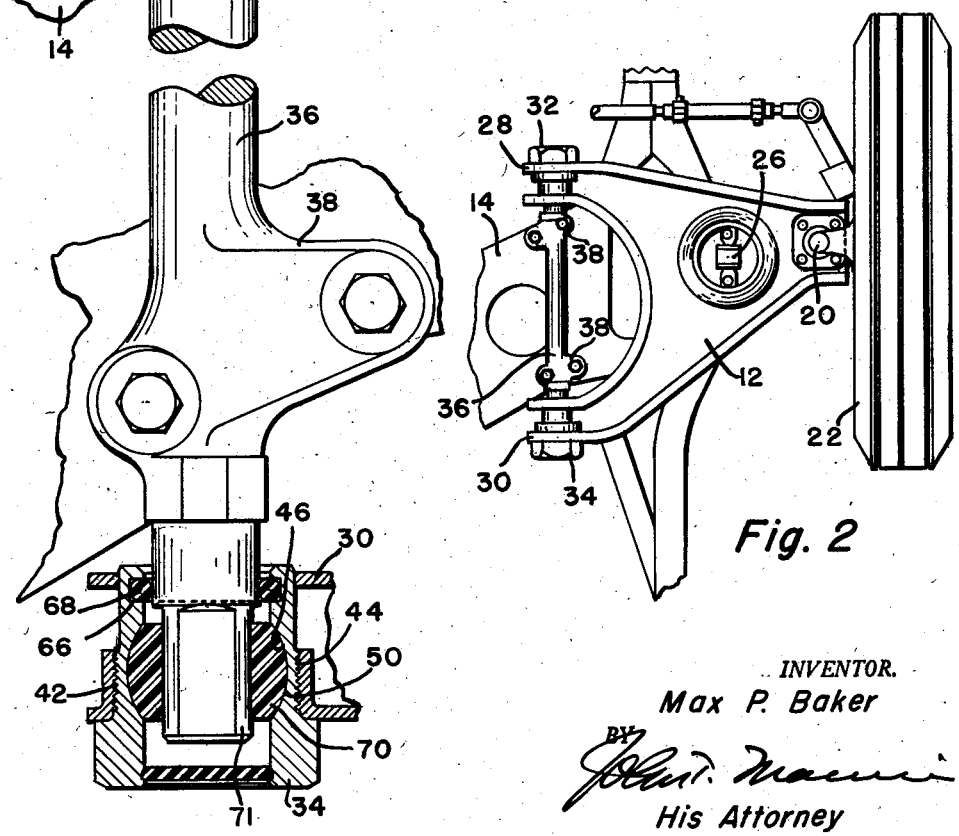
Fig. 2
INVENTOR.
Max P. Baker
His Attorney Dec. 2, 1958   M. P. BAKER   2,862,741
OSCILLATORY JOINT Filed Oct. 16, 1956   2 Sheets-Sheet 2

INVENTOR.
Max P. Baker
BY
His Attorney

United States Patent Office 2,862,741
Patented Dec. 2, 1958

2,862,741

OSCILLATORY JOINT

Max P. Baker, Dayton, Ohio, assignor to General Motors Corporation, Detroit, Mich., a corporation of Delaware Application October 16, 1956, Serial No. 616,268

3 Claims. (Cl. 287—85)

This invention relates to improvements in joints permitting relative movement between parts and in particular to a means for connecting the journals of a shaft member for relatively rotatable or oscillatory movement of the members.

In some conventional automobile front wheel suspension constructions, a front wheel is connected to the car frame by means of vertically spaced upper and lower wishbone-like or bifurcated support members having their furcated ends provided with bearing members to receive oppositely journaled portions of a shaft-like support arm rigidly attached to the car frame, and having their opposite ends pivotally attached in vertically spaced relation to a yoke which in turn is rigidly attached to an independent wheel unit. The bearing members receiving the journaled portions of the support arm generally consist of a cylindrical rubber bushing having inner and outer metal sleeves, carried on the furcated portions of the wishbone member.

In the operation of an automobile the bifurcated members are subjected to considerable tortional stress, tending to cause misalignment of the furcated members and consequent binding and obstruction to oscillatory movement of the shaft member with respect to the furcated member.

It is among the objects of the present invention to provide an arrangement for journaling a shaft at spaced points in bearing members associated with the furcations of a bifurcated member for relatively rotatable or oscillatory movement of the members which provides for self-alignment of the bearing members with respect to the journals whereby the binding incident to a distortion of the bifurcated member is minimized, and which permits the members to be readily assembled and adjusted with respect to each other for efficient operation.

In general the invention involves providing opposed partially spherical ball portions on the shaft member which are received in complementary socket members axially adjustably associated with the furcated portions of the bifurcated member. In preferred form, the ball members are formed of a high impact synthetic resin material and are locked against rotation relative to the shaft members. Means associated with the shaft member is provided for applying axial pressure to at least one of the ball members whereby the shaft is locked against axial displacement relative to the ball members, and the ball member to which axial pressure is applied may be caused to snugly engage the complementary socket member.

Further objects and advantages of the present invention will be apparent from the following description, reference being had to the accompanying drawings wherein preferred embodiments of the present invention are clearly shown.

In the drawings:

Figure 1 is a broken away elevation view of a conventional automobile front wheel suspension embodying the present invention.

Figure 2 is a bottom view of the suspension mechanism shown in Figure 1.

Figure 3 is an enlarged broken away view of the journaled shaft member of Figure 2 showing the bearing portions in cross section.

Figure 4:
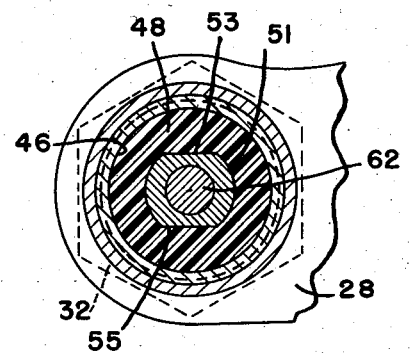
Figure 4 is a cross section taken along line 4—4 of Figure 3.

Referring now to Figure 1 of the drawings, the present invention is illustrated in connection with the suspension of one wheel of a conventional automobile front wheel suspension which includes upper and lower wishbone-like or bifurcated members 10 and 12 respectively, having the furcations thereof connected for oscillatory relative movement to the car frame 14 in accordance with the present invention as hereinafter described in detail, and having their opposite ends connected to a yoke 16 by means of ball joints 18 and 20 respectively, the yoke 16 being rigidly attached to the wheel unit 22. Interposed between the lower wishbone member 12 and the frame 14 is a conventional compression coil spring 24 and fluid shock absorber assembly 26.

The wishbone or bifurcated members 10 and 12 are similarly attached to form vertically spaced connecting links between the car frame 14 and wheel unit 22 and the present invention which involves means for connecting the furcated portions of the wishbone or bifurcated members to the frame 14 for relative oscillatory motion is shown in detail in Figures 2 and 3. Figure 2 is a bottom view of the suspension assembly shown in Figure 1, and shows in particular the bifurcated member 12 having opposed and aligned bearing or socket members 32 and 34 associated with the furcations 28 and 30, respectively. Journaled in the socket members are end portions of a shaft-like member 36 which is rigidly secured to the frame 14 by means of bracket portions 38 bolted or otherwise secured to the frame.

Figure 3 is a fragmentary view of the shaft-like member 36 of Figure 2 showing in cross section the socket portions 32 and 34 and the furcations 28 and 30 associated therewith. The socket member 32 is in the form of a sleeve open at opposite ends having a nut-like end portion 40 and an externally threaded portion 42 adjacent the nut portion 40 which is received by a threaded opening 44 provided in the furcation 28 of the bifurcated member 12. The socket member 32 has an internal partially spherical portion 46 formed therein which snugly receives a partially spherical ball member 48 preferably formed of a high impact synthetic resin molded in situ against the partially spherical socket surfaces 46, having an opening 50 therethrough for preferably nonrotatably receiving an end 51 of the shaft member 36. The shaft end is preferably formed to have opposed flat surface portions 53 and 55 as shown in Figure 4 which prevent relative rotation between the shaft and ball members but permit relative longitudinal movement of the parts.

The partially spherical ball member 48 is preferably shaped to have flat radial inner and outer end portions 54 and 56 respectively. The inner end portion 54 is seated against an annular shoulder 58 provided on the shaft. The shaft end 51 is provided with a longitudinal threaded bore 60 for receiving a bolt 62 which holds a washer member 61 in engagement with the outer flat surface 56 of the ball member 48.

The outer end of the socket member is provided with a demountable flat plug 64 of relatively flexible material such as rubber or a flexible synthetic resin, which seats in a receiving groove in the socket member. The space between the plug 64 and the ball member 48 is preferably loaded with a suitable lubricant and the plug 64 serves to prevent the egress of the lubricant and the ingress of dirt, moisture and the like deleterious materials into the socket.

The inner end of the socket member is provided with an internal groove 66 which carries an elastomeric O ring type 68 which is in sealing engagement with the walls of groove 66 and the shaft to prevent ingress of deleterious substances into the socket and the egress of lubricant packed in the space between the ball member 48 and the seal 68.

The opposite furcation 30 of the wishbone member 12 carries a socket member 34 identical in all respects to the socket member 32 except the ball member 70 does not necessarily seat against a shoulder of the shaft and does not involve a bolt member associated with the shaft to lock the ball 70 against relative movement longitudinally to the shaft.

Figure 5:
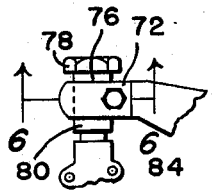
Figure 5 is a broken away view showing a different modification of a journaled portion of a shaft member journaled with respect to a furcation of a bifurcated member.

Figure 5 is a fragmentary view of a modified joint having a furcation 72 corresponding to the furcation 28 of Figure 2 which may be used in place thereof. In this modification, as may be seen in reference to Figure 6, the furcation 72 is provided with an opening 74 having a smooth bore and of a size to slidably receive the socket member 76 provided with a head 78 and relatively smooth outer surface 80. The furcation is further provided with relatively deep slot 82 longitudinally of the bore 74 and a bolt 84 transversely of the slot whereby the socket member 76 may be adjustably clamped in the frucation in a well known manner.

The structure of this invention offers several important advantages. Relative rotation between the parts is between the outer surfaces of the partially spherical ball 48 and the internal partially spherical surfaces 46 of the socket member thereby providing an increased bearing surface. The wishbone members in an automobile suspension such as the member 12 are usually conveniently made of relatively thin metal stampings which tend to distort somewhat due to tortional forces imposed on the vehicle during the operation thereof and in the fabrication of the wishbone members the socket receiving openings of the furcations 28 and 30 may not be perfectly aligned. The subject ball joint type journals permit a limited misalignment of the wishbone member relative to the shaft member without a binding of the joint and permit the parts to be assembled even though the socket receiving openings of the furcations are not perfectly aligned, due to the universal character of the joints.

In assembling the joint the shaft ends 51 and 71 are readily inserted into the openings 44 of the bifurcated member due to the difference in size of the shaft ends in comparison to the openings 44. Thereafter socket members 32 and 34 having the ball members 48 and 70 associated therewith are screwed into the openings of the furcations 28 and 30 so that the shaft ends slide into the ball members of the sockets. Finally the bolt 62 carrying the washer 61 is screwed into place so that the washer is drawn up tightly against the radial surface 56 of the ball to hold the ball tightly between the washer and the shoulder 58 of the shaft to secure the shaft to the ball and further to position the shaft relative to the internal spherical surfaces of the socket. In the embodiment shown in Figure 3 the shaft end 71 is not secured against longitudinal movement relative to the ball member which makes allowance for differences in the distance between the furcations 28 and 30 in different wishbone members made by typical mass production techniques.

Figure 6:
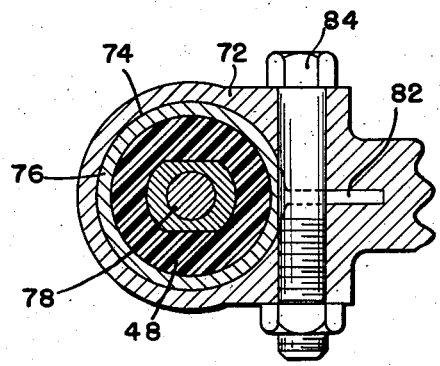
Figure 6 is a cross sectional view taken along line 6—6 of Figure 5.

In some installations it may be desirable to secure both shaft ends of the shaft member 36 to the ball members as is shown in connection with shaft end 51 and ball member 48 to produce a more rigid structure. In this construction the adjustable socket holding means shown in Figures 5 and 6 is preferable since minor adjustments due to the difference between the furcations 28 and 30 may be readily made whereas the screw thread means shown in Figure 3 would require washers and the like to permit minor adjustments and yet secure the sockets tightly to the furcations.

The shaft ends 51 and 71 are preferably nonrotatable relative to their respective ball members to insure that relative rotation is between the balls and the sockets. This is desirable because of the greater bearing surface involved between the ball and socket members and further because relative rotation between the shaft ends and the ball members would tend to cause damage to the ball due to the tight engagement of the ball member and the washer 61 and shoulder 58 of the shaft. The ball member 48 is preferably formed of somewhat greater length than the length of the shaft end 51 measured from the shoulder 58 so that the ball may be compressed by means of the bolt 62 to hold the ball firmly in place and further to take up undesirable slack between the ball and the socket due to the wear of the ball.

Figure 7:
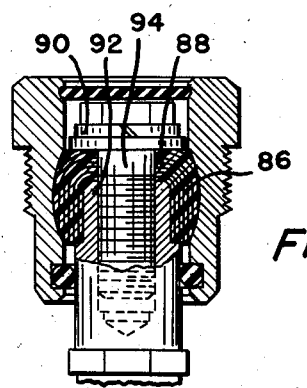
Figure 7 is another modification showing a journaled shaft member.

Figure 7 shows another modification of a ball and socket member which may be used in connection with the present invention. This modification involves a ball member 86 having an annular portion 88 thereof clamped between the washer 90 and the end of the shaft 92 which permits the ball member to be securely clamped to the shaft end and further provides a greater mass of synthetic resin material to be compressed by the bolt and washer to take up greater slack between the ball member and the socket member due to wear.

The ball portion 86 of Figure 7 may be conveniently molded within the socket member by providing a male mold member of the shape of the end of the shaft member including the shank portion 94 of the bolt. A preformed stack of synthetic resin, such as a phenolic resin, impregnated disks, having a cylindrical central opening therethrough of the diameter of bolt portion 94 and the corresponding aforementioned male mold portion, is then prepared. The projecting male mold portion corresponding to the bolt portion 94 is then inserted into the cylindrical opening of the stack and the stack is forced into the partial spherical cavity of the socket member. The latter molding step is of course performed with the aid of suitable mold members which close both ends of the socket member to mold the ball 88 in place within the socket and to provide flat radial sides on each end of the ball member.

By the term "elastomer" herein is meant rubber-like materials such as natural rubber, butadiene-acrylonitrile copolymers, butadiene-styrene copolymers, polychloroprene, and various mixtures of these and similar materials.

The ball members such as ball member 48 are preferably made of moldable high impact synthetic resin materials. Examples of suitable materials include fiber filled phenolic resins such as the condensation product of formaldehyde and phenol fiber filled urea formaldehyde condensation products and polyamides and superpolyamides of the type disclosed in the U. S. Patents 2,071,253 and 2,130,948 compounded for high impact strength. Various resinous materials compounded to provide high impact strength suitable for the present purpose are well known in the art, the above-mentioned materials being suitable examples. These resinous materials may contain materials such as graphite and molybdenum disulfide which impart desirable self-lubricating qualities thereto.

Related subject matter is disclosed in the copending application S. N. 616,154 (Docket No. IN-1390) assigned to the assignee of the present invention filed concurrently herewith.

While the embodiments of the present invention as herein disclosed constitute preferred forms, it is to be understood that other forms might be adopted.

What is claimed is as follows:

1. An oscillatory joint assembly, comprising in combination; a shaft member, a bifurcated support member adapted to support said shaft member between the furcations thereof, two opposed bearing means, one of which is carried by each of the furcations, each of said bearing means including a socket member having a generally spherical cavity, a pair of generally spherical ball members journalled in said cavities and each having a bore therethrough, said bores being adapted to receive opposed end portions of said shaft, said shaft including means on said end portions received by said bores for preventing relative rotational movement between the shaft and the spherical ball members, said shaft being slidable within the bore of at least one of said spherical ball members.

2. The joint assembly as claimed in claim 1 wherein the end of the shaft opposite the slidable end is secured against relative slidable movement in the spherical ball member.

3. The oscillatory joint assembly as claimed in claim 1 wherein the generally sphecial ball members are made from high impact synthetic resin.

References Cited in the file of this patent

UNITED STATES PATENTS

| | | |
|---|---|---|
| 2,061,985 | Saurer | Nov. 24, 1936 |
| 2,171,157 | Mathews | Aug. 29, 1939 |
| 2,287,608 | French | June 23, 1942 |
| 2,305,880 | Leighton | Dec. 22, 1942 |
| 2,753,225 | Gilmer | July 3, 1956 |
| 2,771,259 | Laystrom | Nov. 20 1956 |